Aug. 17, 1943.     W. RICE     2,327,290
ELECTRODE HOLDER
Filed June 29, 1942
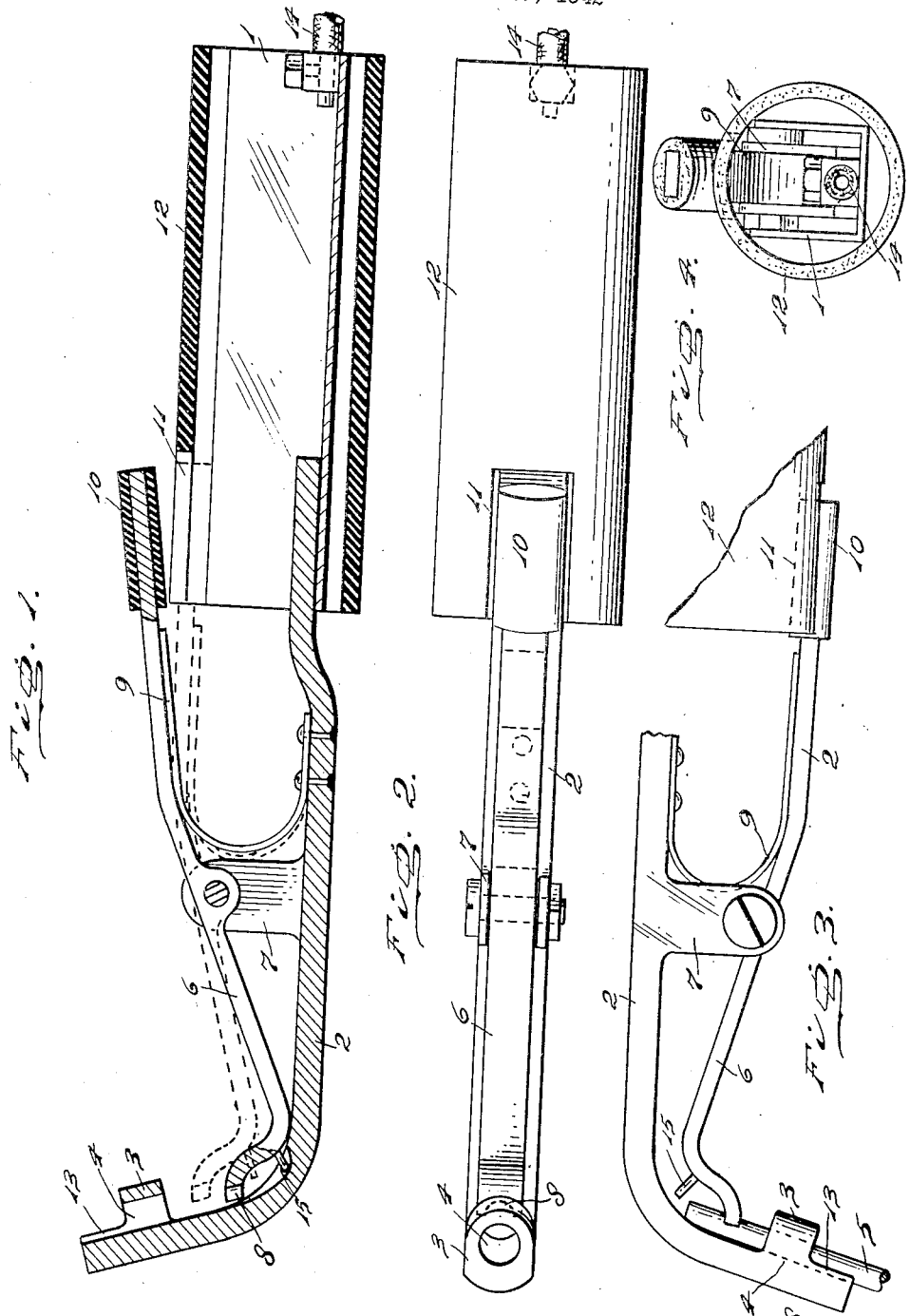
INVENTOR
William Rice
BY
Herbert V. Fairbanks
ATTORNEY Patented Aug. 17, 1943

2,327,290

UNITED STATES PATENT OFFICE 2,327,290

ELECTRODE HOLDER

William Rice, Aldan, Pa.

Application June 29, 1942, Serial No. 449,003

3 Claims. (Cl. 219—8)

My invention relates to electrode holders for welding rods, and provides for the proper manipulation of the holder and the proper positioning of the free end of the welding rod during the welding operation.

Devices of this character, as heretofore manufactured, were so constructed that they were difficult to manipulate in close quarters, such as for example angular spaces, offsets, corners and in places where there was only a small clearance with the electrode holder.

Another serious objection to electrode holders as heretofore made was that the welding rod was held in the holder in such a manner that two or more inches of the welding rod could not be used, thus increasing the cost of the rods used.

In some cases the clamping handle extended outwardly from the grasping handle to such an extent as to interfere with the proper manipulation of the holder, and also to prevent the proper visibility of the work.

One object, therefore, of this invention is to devise an electrode holder which will overcome the foregoing objections.

With the above and other objects in view, as will hereinafter clearly appear, my invention comprehends a novel electrode holder.

It further comprehends a novel electrode holder having a novel construction and arrangement of a rod holding member, which is laterally deflected at its forward end and terminates in a head of novel construction, and novel means are provided for clamping the welding rod in an opening in the head.

Other novel features of construction and advantage will hereinafter appear in the description and the appended claims.

For the purpose of illustrating the invention, I have shown in the accompanying drawing a preferred embodiment of the invention which I have found in practice to give satisfactory and reliable results. It is, however, to be understood that this embodiment is typical only, and that the various instrumentalities of which the invention consists can be variously arranged and organized, and the invention is not limited to the exact organization and arrangement of these instrumentalities as herein shown.

Figure 1 is a sectional elevation of the electrode holder.

Figure 2 is a top plan view.

Figure 3 is a side elevation, showing the electrode holder in its normal position of use when the work is beneath it.

Figure 4 is an end elevation of the electrode holder.

Similar numerals of reference indicate corresponding parts.

Referring to the drawing:

1 designates the body portion of an electrode holder embodying my invention. The body portion is preferably of channelled construction, and has seated in and fixed to it in any desired manner, for example, by welding, an electrode holding member 2 in the form of a longitudinally extending bar, which, if desired, may be integral with the body portion. The member 2 is offset or laterally deflected near its forward end, see Figure 2, and is provided with a head 3, having an opening 4 which is large enough to receive welding rods 5 of different thickness.

The welding rod 5, when in clamped position, has its inner end contacting with the bar and a portion outwardly thereof clamped in the opening in the head. The welding rod is clamped in operating position by a clamping member 6, in the form of a clamping lever pivoted in a bracket 7, fixed to the holding member 2. The forward or clamping end of the lever 6 is preferably recessed or shaped, as at 8, to make firm contact with and to partially surround the welding rod. The clamping lever is tensioned by a spring 9, positioned between the two members, and tending to move and retain the clamping lever in its clamped position. In clamped condition, the welding rod at its inner end engages the holding member and the portion of the rod in the opening in the head is pressed against the wall of such opening. The head 3 is preferably quite short so that only a short portion of the rod will be used for clamping purposes and preferably an inch or less of the rod is used for clamping. The opening movement of the clamping lever is limited by its contact with the head.

The grasping portion of the clamping lever is covered with heat insulating material 10, and is movable into a slot 11 in the heat-insulated grasping portion 12 of the electrode holder, which surrounds the channelled body portion. The head is cut away at one side at 13 in order to enable the tool to be manipulated in restricted spaces, and to increase the visibility of the work during the welding operation. It also provides for the easy removal of the welding rod from the electrode holder.

An electric conductor 14 is welded or otherwise secured in the channel of the body portion.

When a welding rod is to be used, it is inserted through the opening in the head with its inner end preferably contacting the holding member, and upon release of the clamping lever the welding rod will be clamped against the walls of the opening in the head. The forward end of the clamping lever is preferably in close proximity to the head so as to provide a short clamping mechanism.

By having the forward end of the holding member for the welding rod offset, the electrode holder can be used where there is a minimum of clearance, such as pockets, angular spaces and corners.

By having the clamping lever movable into the grasping handle, the size of the electrode holder is materially reduced, and the visibility of the work being welded is increased.

In some cases it is advantageous to employ a stud or projection 15 from the clamping lever to aid in the removal of a used electrode from the holder, and the bar 2 may be recessed as shown in Figure 1 to provide for the requisite clearance.

The head 3 is preferably located a suitable distance from the free end of the bar 2. This makes it easier to remove an electrode in case it has been welded to the holder since the welding rod can be pried loose from or broken away from its engagement with the bar or holding member 2.

Having thus described my invention, what I claim as new and desire to secure by Letters Patent is:

1. An electrode holder, comprising a handle, a bar fixed to the handle and having its forward end curving upwardly and provided with a groove on its inner face and an apertured head inwardly of and merging into said groove, a clamping lever fulcrumed on the bar and having its forward end adapted to clamp an electrode against said bar inwardly of said head, and a spring tending to retain said clamping lever in its unclamped position.

2. An electrode holder, comprising a handle having a slot at its forward end, a bar fixed to the handle, curving upwardly at its forward end and having on its inner face an apertured head spaced from the free end of the bar, a clamping lever fulcrumed on the bar, having its forward end adapted to clamp an electrode against said bar in rear of said head, and having its rear end adapted to enter said slot when the lever is in clamped position, and a spring tending to retain said clamping lever in unclamped position.

3. An electrode holder, comprising a handle, a bar fixed at its rear end to the handle and having its free end curving upwardly and provided with an apertured head spaced from said free end, a clamping lever fulcrumed on the bar and having its forward end deflected upwardly and forwardly to clamp an electrode in said head against said bar, an ejecting pin near the forward end of and carried by said clamping lever and positioned to contact the inner end of an electrode and eject it from said head and bar, and a spring tending to retain said clamping lever in its unclamped position.

WILLIAM RICE.